United States Patent
Sumiya

(10) Patent No.: US 9,227,166 B2
(45) Date of Patent: Jan. 5, 2016

(54) HIGH-HARDNESS POLYCRYSTALLINE DIAMOND AND METHOD OF PREPARING THE SAME

(75) Inventor: Hitoshi Sumiya, Itami (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 968 days.

(21) Appl. No.: 11/988,891

(22) PCT Filed: Jul. 21, 2006

(86) PCT No.: PCT/JP2006/314470
§ 371 (c)(1),
(2), (4) Date: Jan. 16, 2008

(87) PCT Pub. No.: WO2007/011019
PCT Pub. Date: Jan. 25, 2007

(65) Prior Publication Data
US 2009/0305039 A1     Dec. 10, 2009

(30) Foreign Application Priority Data

Jul. 21, 2005   (JP) .................. 2005-211140
Aug. 22, 2005   (JP) .................. 2005-239815
Oct. 4, 2005    (JP) .................. 2005-290967

(51) Int. Cl.
*B01J 3/06*     (2006.01)
*B82Y 30/00*    (2011.01)
(Continued)

(52) U.S. Cl.
CPC ............. *B01J 3/062* (2013.01); *B82Y 30/00* (2013.01); *C04B 35/52* (2013.01); *C04B 35/6261* (2013.01); *C04B 35/645* (2013.01);
(Continued)

(58) Field of Classification Search
None
See application file for complete search history.

(56) References Cited

U.S. PATENT DOCUMENTS 5,540,904 A * 7/1996 Bovenkerk et al. ........... 423/446

FOREIGN PATENT DOCUMENTS

JP    61-219759    9/1986
JP    04-074766    3/1992
(Continued)

OTHER PUBLICATIONS

Irifune. et al.; Formation of Pure Polycrystalline diamond by direct conversion of graphite at High Pressure and high Temperature; Physics of the Earth and Planetary Interiors, 143-144, 593-600; 2004.*
(Continued)

*Primary Examiner* — Guinever S Gregorio
(74) *Attorney, Agent, or Firm* — McDermott Will & Emery LLP

(57) ABSTRACT

There are provided sufficiently strong, hard, and heat resistant, dense and homogenous polycrystalline diamond applicable to cutting tools, dressers, dies and other working tools and excavation bits and the like, and a cutting tool having a cutting edge of the polycrystalline diamond. The polycrystalline diamond is formed substantially only of diamond formed using a composition of material containing a non diamond type carbon material, the composition of material being converted directly into diamond and sintered at ultra high pressure and ultra high temperature without aid of a sintering aid or a catalyst, and has a mixed microstructure having a fine crystal grain of diamond having a maximal grain size of at most 100 nm and an average grain size of at most 50 nm and a coarse crystal grain of diamond in the form of one of a platelet and a granule having a grain size of at least 50 nm and at most 10,000 nm.

16 Claims, 2 Drawing Sheets

(51) Int. Cl.
  *C04B 35/52* (2006.01)
  *C04B 35/626* (2006.01)
  *C04B 35/645* (2006.01)

(52) U.S. Cl.
  CPC ..... *B01J2203/068* (2013.01); *B01J 2203/0625* (2013.01); *B01J 2203/0655* (2013.01); *B01J 2203/0685* (2013.01); *C04B 2235/422* (2013.01); *C04B 2235/425* (2013.01); *C04B 2235/427* (2013.01); *C04B 2235/528* (2013.01); *C04B 2235/5288* (2013.01); *C04B 2235/5436* (2013.01); *C04B 2235/5445* (2013.01); *C04B 2235/5454* (2013.01); *C04B 2235/656* (2013.01); *C04B 2235/78* (2013.01); *C04B 2235/781* (2013.01); *C04B 2235/785* (2013.01); *C04B 2235/96* (2013.01); *Y10T 428/2982* (2015.01)

(56) References Cited

FOREIGN PATENT DOCUMENTS

| | | | |
|---|---|---|---|
| JP | 04-114966 | | 4/1992 |
| JP | 05-270987 | | 10/1993 |
| JP | 62-41708 | A | 9/1994 |
| JP | 08-141385 | | 6/1996 |
| JP | 11-100297 | | 4/1999 |
| JP | 2002-066302 | | 3/2002 |
| JP | 2003-292397 | | 10/2003 |
| JP | 2003292397 | A * | 10/2003 |
| JP | 2004-131336 | | 4/2004 |
| JP | 2004-168558 | | 6/2004 |

OTHER PUBLICATIONS

Derwent Abstract Wang CN 1235122 A; 1997.*
Over Irifune. et al.; Formation of Pure Polycrystalline diamond by direct conversion of graphite at High Pressure and high Temperature; Physics of the Earth and Planetary Interiors, 143-144, 593-600; 2004.*
Kawarada et al.; Diamond Synthesis by DC Plasma Jet CVD; SPIE vol. 1146 Diamond Optics II; 1989.*
Irifune et al. "Nature of polycrystalline diamond synthesized by direct conversion of graphite using Kawai-type multianvil apparatus" New Diamond and Frontier Carbon Technology, vol. 14, No. 5. pp. 313-327, 2004.
Bundy et al. "The Pressure-Temperature Phase and Transformation Diagram for Carbon; Updated Through 1994" Carbon, vol. 34, No. 2, pp. 141-153, 1996.
F. P. Bundy, "Direct Conversion of Graphite to Diamond Static Pressure Apparatus", The Journal of Chemical Physics, vol. 38, No. 3, pp. 631-643, Feb. 1, 1963.
Wakatsuki et al. "Notes on Compressible Gasket and Bridgman-Anvil Type High Pressure Apparatus", Japanese Journal of Applied Physics, vol. 11, No. 4, pp. 578-590, Apr. 1972.
Naka et al. "Direct Conversion of graphite to diamond under static pressure", Nature, vol. 259, pp. 38-39, Jan. 1 & 8, 1976.
Sumiya et al. "Synthesis of High-purity Nano-Polycrystalline Diamond and Its Characterization", SEI Technical Review, vol. 165 pp. 68-74, 2004.
Namba et al. "Size effects appearing in the Raman spectra of polycrystalline diamonds", Journal of Appl. Phys. vol. 72. No. 5., pp. 1748-1751, Sep. 1, 1992.
Yoshikawa et al. "Raman scattering from diamond particles", Appl. Physi Lett. vol. 62, No. 24., pp. 3114-3116, Jun. 14, 1993.
Banholzer, et al. "Properties of Diamonds with Varying Isotopic Composition", New Diamond Science and Technology, 1991, MRS Int. Conf. Proc. pp. 857-862.
Japanese Office Action, with English translation, issued in Japanese Patent Application No. 2005-211140, mailed Apr. 8, 2011.
Sumiya, et al. (2004). microstructure features of polycrystalline diamond synthesized directly from graphite under static high pressure. *J Mater Sci*,39(2), 445-450.
Extended European Search Report issued in European Patent Application No. 06768348.2, dated Jan. 5, 2012.
Japanese Notice of Grounds of Rejection, w/ English translation thereof, issued in Japanese Patent Application No. JP 2005-239815 dated Sep. 12, 2011.

* cited by examiner

HIGH-HARDNESS POLYCRYSTALLINE DIAMOND AND METHOD OF PREPARING THE SAME

RELATED APPLICATIONS

This application is the U.S. National Phase under 35 U.S.C. §371 of International Application No. PCT/JP2006/314470, filed on Jul. 21, 2006, which in turn claims the benefit of Japanese Application No. 2005-211140, filed on Jul. 21, 2005, Japanese Application No. 2005-239815, filed on Aug. 22, 2005, and Japanese Application No. 2005-290967, filed on Oct. 4, 2005, the disclosures of which Applications are incorporated by reference herein.

TECHNICAL FIELD

The present invention relates generally to polycrystalline diamond and methods of preparing the polycrystalline diamond, and particularly to polycrystalline diamond having excellently high hardness, excellently high strength and excellent thermal property, that is applied to cutting tools, dressers, dies and other tools and excavation bits and the like, methods of preparing the polycrystalline diamond, and cutting tools having their cutting edges formed of the polycrystalline diamond.

BACKGROUND ART

Polycrystalline diamond applied to conventional cutting tools, dressers, dies and other tools and excavation bits and the like is prepared with Co, Ni, Fe or a similar iron group metal, SiC or similar ceramic, or the like used as a sintering aid or a binder. A polycrystalline diamond prepared with carbonate used as a sintering aid is also known (see patent documents 1 and 2).

They are obtained by sintering powdery diamond together with a sintering aid and/or a binder at high pressure and high temperature that allow diamond to thermodynamically stabilize (normally, a pressure of 5-8 GPa and a temperature of 1,300-2,200° C.). The high pressure and high temperature allowing diamond to thermodynamically stabilize, as referred to herein, is for example a temperature-pressure range indicated in non patent document 1, FIG. 1. On the other hand, natural polycrystalline diamonds (e.g., carbonate and ballas) are also known and some of them are applied to excavation bits. However, they significantly vary in material property and their yields are also small. They are thus not positively used industrially.

When Co or a similar iron group metal catalyst is used as a sintering aid to prepare a sintered polycrystalline diamond compact, the sintering aid is contained in the sintered polycrystalline compact, and acts as a catalyst helping diamond to graphitize. The sintered compact is thus inferior in thermal resistance. More specifically, even in an atmosphere of inert gas, the diamond would be graphitized at approximately 700° C.

If the sintering aid as described above is used in a large amount, the difference in thermal expansion between the sintering aid and the diamond facilitates causing micro cracks in the polycrystal. Furthermore, between grains of diamond, Co or other metal of the sintering aid exists as a continuous layer, which is a factor reducing the polycrystal in hardness, strength and other similar mechanical properties. The sintering aid or the binder is contained in the polycrystalline diamond by at least 10% by volume and, as has been aforementioned, acts as a catalyst helping diamond to graphitize. This not the least affects the polycrystalline diamond in hardness, strength and other mechanical properties, and thermal resistance. Accordingly there is a strong demand for a sintered compact of single-phase diamond that does not contain a sintering aid, a binder or the like.

It is also known that the aforementioned sintered polycrystalline diamond compact is increased in thermal resistance by removing metal at grain boundaries of the diamond. While this approach provides thermal resistance increased to approximately 1,200° C., the polycrystal becomes porous and is hence decreased in strength.

When a binder of SiC, which is non metallic material, is used to prepare a sintered polycrystalline diamond compact, the sintered compact has excellent thermal resistance and does not have pores as aforementioned. However, it does not have diamond grains bonded together and is thus small in strength.

When a sintering aid of carbonate is used to prepare a sintered polycrystalline diamond compact, the sintered compact is superior in thermal resistance to a sintered polycrystalline compact prepared with a binder of Co. However, it has a carbonate material at a grain boundary, and would thus be insufficient in mechanical properties.

On the other hand, diamond can be prepared by a method converting graphite, glassy carbon, amorphous carbon or other similar non diamond carbon at ultra high pressure and ultra high temperature directly into diamond without a catalyst or a solvent. This method allows the carbon to be converted from non diamond phase directly to diamond phase and simultaneously sintered to obtain a polycrystal of single-phase diamond.

For example, non patent documents 2-4 disclose that graphite is used as a starting material and subjected to direct conversion at ultra high pressure and ultra high temperature of at least 14-18 GPa and 3,000K, respectively, to provide polycrystalline diamond.

If these methods are used to prepare polycrystalline diamond, however, graphite or a similar, electrically conductive, non diamond carbon is heated by passing an electric current directly therethrough, and it is unavoidable that the polycrystalline diamond has unconverted graphite remaining therein. Furthermore, the methods also provide diamond grains varying in size and tend to provide partially insufficient sintering. This provides unreliable hardness, strength and other mechanical properties, and can only provide a polycrystal in the form of a chip. Furthermore, the methods require ultra high pressure and ultra high temperature exceeding 14 GPa and 3,000K, respectively, and thus entail extremely high production costs and are low in productivity. They are thus inapplicable to cutting tools, bits and the like and have not reached practical utilization.

The present inventors have found in the preparation of polycrystalline diamond by the direct conversion as described above that non diamond carbon or highly pure graphite-like carbon mechanically pulverized in inert gas to be a carbon material which has a microstructure of fine crystal grains of at most tens nm in size or is amorphousized can be used as a material to allow conversion into diamond even at relatively mild, ultra high pressure and ultra high temperature and simultaneously allow crystal grains of diamond having a small grain size of at most tens nm and having a narrow grain size distribution to be firmly bonded together to provide dense polycrystalline diamond formed of substantially 100% diamond, and the present inventors have filed a patent application therefor (see patent document 3).

Furthermore, for example, patent document 4 describes a method heating carbon nanotube to at least 10 GPa and at least 1,600° C. to synthesize fine diamond. However, the carbon nanotube used as a material is expensive and thus contributes to high production cost. Furthermore in the method, the carbon nanotube is pressurized by a diamond anvil transmitting light, and heated by condensed $CO_2$ gas laser light through the anvil. The method in reality cannot produce homogenious polycrystalline diamond of a size applicable to cutting tools and the like.

Accordingly the present inventors have invented a method using high purity graphite as a starting material and subjecting it to direct conversion and sintering by indirect heating at ultra high pressure and ultra high temperature of at least 12 GPa and at least 2,200° C., respectively, to obtain a dense and highly pure polycrystalline diamond (see non patent documents 5 and 6). A polycrystal of single-phase diamond obtained by direct conversion and sintering at ultra high pressure and ultra high temperature with graphite used as material, was applied to a cutting tool for evaluation in performance. It has been found to, on one hand, be significantly superior to a sintered diamond compact containing a binder as conventional, but on the other hand, vary in performance between samples.

In other words, this method provides diamond which on one hand may be significantly hard but on the other hand is insufficient in reproducibility, varies in mechanical property and provides insufficient cutting performance.

A diamond crystal normally provides a first-order Raman spectral line appearing at $1,332.0$ $cm^{-1}$, which is a value of almost defectless and strainless, high quality, synthetic diamond, and it is known that when diamond experiences stress for compression, the value shifts to a higher wave number. It shifts by an amount of approximately 2 $cm^{-1}$ for 1 GPa, although it depends on how the stress is exerted.

Furthermore, it is also known that a diamond crystal having a diamond grain smaller in size provides spectra weakened and broadened, and a first-order Raman spectral line shifted to a lower wave number (see non patent documents 7 and 8). For example, a diamond grain having as small a size as approximately 1 μm provides a first-order Raman spectral line shifted positionally to a lower wave number by approximately 5 $cm^{-1}$. More specifically, diamond which is highly pure and devoid of crystal defect and has a grain size of at least 10 μm provides a first-order Raman spectral line appearing at 1,332 $cm^{-1}$, whereas diamond having as fine a grain size as approximately 1 μm provides a first-order Raman spectral line shifted to 1,327 $cm^{-1}$.

Patent document 5 discloses a method adding i-carbon or diamond-like carbon to powdery diamond and processing them at high temperature and high pressure in a range allowing diamond to thermodynamically stabilize, to obtain polycrystalline diamond. This method, however, employs powdery diamond having a grain size of at least 1 μm, and furthermore, converts i-carbon into diamond and grows it on a surface of the powdery diamond. As such, the method provides polycrystalline diamond which tends to have unconverted graphite, a void and the like remaining therein (a density of 3.37 $g/cm^3$; approximately 96% of true density of diamond) and also has a hardness of 6,600 $kg/mm^2$, which is a small value for a polycrystal of single-phase diamond.

Furthermore, non diamond type carbon mainly composed of C13 is used as a material to prepare diamond in a method. More specifically, C13 methane is used as a material and chemical vapor deposition (CVD) is employed to obtain C13 polycrystalline diamond. Normally, however, polycrystalline diamond obtained through CVD does not undergo a sintering process. It thus has its grains bonded with small force and also having oriented growth. It is thus insufficient in mechanical property to be applied to cutting tools, anti-wear tools and the like. Furthermore, monocrystalline diamond grown with the CVD-synthesized C13 used as a material is also known (see for example non patent document 9). However, as this diamond is monocrystalline, it is cleavable and has anisotropy in hardness, and is thus inapplicable to a wide range of tools.

Patent Document 1: Japanese Patent Laying-open No. 4-74766

Patent Document 2: Japanese Patent Laying-open No. 4-114966

Patent Document 3: Japanese Patent Laying-open No. 2004-131336

Patent Document 4: Japanese Patent Laying-open No. 2002-66302

Patent Document 5: Japanese Patent Laying-open No. 61-219759

Non-Patent Document 1: F. P. Bundy, et al., Carbon, Vol. 34, No. 2 (1996) 141-153

Non-Patent Document 2: F. P. Bundy, J. Chem. Phys., 38 (1963) 631-643

Non-Patent Document 3: M. Wakatsuki, K. Ichinose, T. Aoki, Jap. J. Appl. Phys., 11 (1972) 578-590

Non-Patent Document 4: S. Naka, K. Horii, Y. Takeda, T. Hanawa, Nature 259 (1976) 38

Non-Patent Document 5: New Diamond and Frontier Carbon Technology, 14 (2004) 313 [T. Irifune, H. Sumiya]

Non-Patent Document 6: SEI Technical Review, 165 (2004) 68 [Sumiya, Irifune]

Non-Patent Document 7: J. Appl. Phys., 72 (1992) 1748 [Y. Namba, E. Heidarpour, M. Nakayama]

Non-Patent Document 8: Appl. Phys. Lett., 62 (1993) 3114 [M. Yoshikawa, Y. Mori, M. Maegawa, G. Katagiri, H. Ishida, A. Ishitani]

Non-Patent Document 9: W. Banholzer et al., New Diamond Science and Technology, 1991, MRS Int. Conf. Proc., pp. 857-862

DISCLOSURE OF THE INVENTION

Problems to be Solved by the Invention

As described in Non-Patent Documents 5 and 6, when graphite is used as a starting material and processed at least 12 GPa and at least 2,200° C. to obtain polycrystalline diamond, the polycrystalline diamond on one hand varies in hardness between samples but on the other hand some of such polycrystalline diamond exhibits a significantly large hardness exceeding 120 GPa.

The present inventors have examined the ground for this by elaborately investigating what relationship the polycrystalline diamond has between its microstructure and mechanical property, and have conformed that the polycrystalline diamond can have a mixed microstructure having a lamellar structure and a fine homogenous structure mixed together, and that polycrystalline diamond having these structures distributed at an appropriate ratio exhibits a significantly large hardness exceeding 120 GPa, whereas polycrystalline diamond formed only of the fine homogenous structure has a hardness decreased to approximately 70 GPa to 100 GPa. The present inventors have further investigated the ground therefor and as a result confirmed that the lamellar structure provides an effect effectively preventing plastic deformation and extension of micro cracks to allow the polycrystalline diamond to exhibit significant toughness and high hardness.

In addition, the present inventors have also confirmed that the lamellar structure and the fine homogenous structure are provided at a ratio, which varies depending on the state of graphite serving as a starting material and a subtle difference in temperature elevation time, rate and pressure, and the like, and this is a cause of unstable mechanical property.

Furthermore the present inventors have diversely studied a polycrystal of a single-phase diamond obtained by direct conversion and sintering at ultra high pressure and ultra high temperature with graphite used as a material, and have obtained a founding that among such polycrystalline diamonds as aforementioned that are approximately equal in grain size, those providing a first-order Raman spectral line shifted to higher wave numbers exhibit better cutting performance.

Accordingly the present invention contemplates significantly hard and tough polycrystalline diamond free of such disadvantages as described above, formed of diamond converted directly from non diamond carbon, and a method of preparing such polycrystalline diamond.

Furthermore the present invention also contemplates sufficiently strong, hard and thermally resistant, dense and homogenous polycrystalline diamond that can solve the aforementioned disadvantages in the conventional art and be applied to cutting tools, dressers, dies and other working tools and excavation bits and the like. Furthermore it also contemplates a cutting tool having a cutting edge employing the polycrystalline diamond.

Means for Solving the Problems

The present inventors have thoroughly studied to solve the above problems and as a result found that in a method converting non diamond carbon directly into diamond at ultra high pressure and ultra high temperature, relatively coarse platelet graphite or relatively coarse diamond, with a non graphite type carbon material or graphite low in crystallinity or in the form of fine grains added thereto, can be used as a starting material to provide, at relatively mild, high pressure and high temperature, polycrystalline diamond having a microstructure having fine grains of diamond forming a matrix and lamellar or relatively coarse diamond crystals distributed in the matrix, and that the lamellar or relatively coarse grains of diamond can effectively prevent plastic deformation and extension of micro cracks to provide significantly reliably hard and tough polycrystalline diamond.

Furthermore the present inventors have found that in a method converting non diamond carbon directly into diamond at ultra high pressure and ultra high temperature, a non diamond type carbon that is a carbon material containing C13, an isotope of carbon, by at least 50% can be converted into diamond and sintered under an appropriate condition to obtain, under a condition milder than conventional, dense polycrystalline diamond formed of grains of diamond containing C13 by at least 50%, having a grain size as significantly fine as at most tens nm, and also firmly bonded together.

The present invention has been completed as based on these findings and resolves the aforementioned disadvantages by adopting the following configurations (1)-(24):

More specifically the present invention provides:

(1) High-hardness polycrystalline diamond formed substantially only of diamond formed using a composition of material containing a non diamond type carbon material, the composition of material being converted directly into diamond and sintered at ultra high pressure and ultra high temperature without aid of a sintering aid or a catalyst. The polycrystalline diamond has a mixed microstructure having a fine crystal grain of diamond having a maximal grain size of at most 100 nm and an average grain size of at most 50 nm and a coarse crystal grain of diamond in the form of one of a platelet and a granule having a grain size of 50-10,000 nm.

(2) The fine crystal grain of diamond may have a maximal grain size of at most 50 nm and an average grain size of at most 30 nm and (3) the coarse crystal grain of diamond may have a grain size of 50-1,000 nm.

(4) High-hardness polycrystalline diamond formed substantially only of grains of diamond, obtained by converting a non diamond type carbon material as material directly into diamond and sintering it at ultra high pressure and ultra high temperature without aid of a sintering aid or a catalyst, the high-hardness polycrystalline diamond providing a first-order Raman spectral line at a wave number of at least 1,332.2 $cm^{-1}$.

(5) The high-hardness polycrystalline diamond of items (1)-(4) having a mixed microstructure having a fine grain of diamond having a maximal grain size of at most 100 nm and an average grain size of at most 50 nm and a coarse grain of diamond in the form of one of a platelet and a granule having a grain size of at most 50-10,000 nm.

(6) The high-hardness polycrystalline diamond of items (2)-(5), wherein the coarse grain of diamond has a maximal grain size of at most 200 nm and an average grain size of at most 100 nm.

(7) The high-hardness polycrystalline diamond of items (2)-(6), wherein the portion formed of such fine grains of diamond accounts for 10-95% by volume thereof.

(8) High-hardness polycrystalline diamond formed substantially only of diamond formed using a composition of material containing a non diamond type carbon material, the composition of material being converted directly into diamond and sintered at ultra high pressure and ultra high temperature without aid of a sintering aid or a catalyst, any diamond crystal configuring the high-hardness polycrystalline diamond being at most 100 nm in maximal grain size and at most 50 nm in average grain size and providing a first-order Raman spectral line at a wave number of at least 1,331.1 $cm^{-1}$.

(9) High-hardness polycrystalline diamond formed substantially only of diamond formed using a composition of material containing a non diamond type carbon material, the composition of material being converted directly into diamond and sintered at ultra high pressure and ultra high temperature without aid of a sintering aid or a catalyst, any diamond crystal configuring the high-hardness polycrystalline diamond being at most 50 nm in maximal grain size and at most 20 nm in average grain size- and providing a first-order Raman spectral line at a wave number of at least 1,330.0 $cm^{-1}$.

(10) The high-hardness polycrystalline diamond is formed substantially only of diamond, contains an isotope of carbon by at least 50%, and has a hardness of at least 90 GPa, the isotope of carbon being C13.

(11) The high-hardness polycrystalline diamond of item (10), wherein the diamond is formed of grains of diamond having a maximal grain size of at most 100 nm and an average grain size of at most 50 nm.

(12) The high-hardness polycrystalline diamond of item (10) or (11), having a hardness of at least 120 GPa.

Furthermore the present invention provides a method of preparing high-hardness polycrystalline diamond, as follows:

(13) A method of preparing high-hardness polycrystalline diamond by converting a composition of material containing a coarse grain of a graphite type carbon material and one of a non graphite type carbon material and a fine graphite type carbon material directly into diamond and simultaneously sintering it without aid of a sintering aid or a catalyst at least 1,500° C. and a pressure allowing diamond to thermodynamically stabilize, the coarse, grain of the graphite type carbon material having an average grain size of at least 50 nm, the fine graphite type carbon material having an average grain size smaller than 50 nm, the non graphite type carbon material accounting for 10-95% by volume of the composition of material.

(14) The method of preparing high-hardness polycrystalline diamond of item (13), wherein the non graphite type carbon material is a fine, non graphite type carbon material formed of a graphite type carbon material mechanically pulverized in an inert gas to have a grain size of at most 50 nm.

(15) The method of preparing high-hardness polycrystalline diamond of item (13) or (14), wherein the non graphite type carbon material is an amorphous carbon material.

(16) The method of preparing high-hardness polycrystalline diamond of any of items (13) to (15), wherein the non graphite type carbon material is a carbon material in the form of one of a cylinder and a tube.

(17) The method of preparing high-hardness polycrystalline diamond of any of items (13) to (16), wherein the non graphite type carbon material is a carbon material in the form of a sphere.

(18) A method of preparing high-hardness polycrystalline diamond by converting a composition of material containing diamond and a non graphite type carbon material directly into diamond and simultaneously sintering it without aid of a sintering aid or a catalyst at least 1,500° C. and a pressure allowing diamond to thermodynamically stabilize, the diamond having an average grain size of at least 50 nm, the non graphite type carbon material accounting for 10-95% by volume of the composition of material.

(19) The method of preparing high-hardness polycrystalline diamond of item (18), wherein the non graphite type carbon material is a fine, non graphite type carbon material formed of a graphite type carbon material mechanically pulverized in an inert gas to have a grain size of at most 50 nm.

(20) The method of preparing high-hardness polycrystalline diamond of item (18) or (19), wherein the non graphite type carbon material is an amorphous carbon material.

(21) The method of preparing high-hardness polycrystalline diamond of any of items (18) to (20), wherein the non graphite type carbon material is a carbon material in the form of one of a cylinder and a tube.

(22) The method of preparing high-hardness polycrystalline diamond of any of items (18) to (21), wherein the non graphite type carbon material is a carbon material in the form of a sphere.

(23) A method of preparing high-hardness polycrystalline diamond by converting a non diamond type carbon material directly into diamond and simultaneously sintering it without aid of a sintering aid or a catalyst at least 1,300° C. and a pressure allowing diamond to thermodynamically stabilize, the non diamond type carbon material containing an isotope of carbon by at least 50%, the isotope of carbon being C13.

(24) The method of preparing high-hardness polycrystalline diamond of item (23), wherein the non diamond type carbon material is pulverized in an atmosphere of an inert gas to have a maximal grain size of at most 100 nm for use.

Effects of the Invention

The present invention can reliably and inexpensively provide significantly hard polycrystalline diamond having fine diamond grains having a grain size of at most 50 nm and forming a matrix and coarse diamond crystal grains in the form of one of a lamella and a granule having a grain size of at least 50 nm and distributed in the matrix.

This polycrystalline diamond is a polycrystal of single-phase diamond that is sufficiently strong, hard and thermally resistant, and dense and homogenous. It is significantly excellent in mechanical property and thermal stability and is a significantly effective material for cutting tools, dressers, dies and other tools and excavation bits and the like, and other similar industrial applications.

The present invention, adopting the above described configuration, has succeeded in resolving conventional problems in the art (i.e., reduced hardness, strength and thermal resistance that are attributed to the existence of a sintering aid, insufficient sintering, and poor reproducibility), and also inexpensively providing dense and homogenous polycrystalline diamond having sufficient strength, hardness and thermal resistance applicable to cutting tools, dressers, dies and other tools and excavation bits and the like. Furthermore the present invention has also succeeded in providing a cutting tool that can maintain a particular cutting performance over a long period of time.

The present polycrystalline diamond is formed substantially only of grains of high-hardness diamond containing C13 by at least 50% and does not contain graphite phase reducing mechanical strength. It is thus high in hardness and strength and has diamond crystal grains having a small and uniform grain size. Thus there is not observed a crack attributed to coarse crystal grains or reduced strength attributed to destruction caused from cleavage as found in monocrystalline diamond.

Furthermore, the present polycrystalline diamond does not contain an iron group metal element as a sintering aid, as conventional. The present polycrystalline diamond thus does not have diamond graphitized in an environment of high temperature, and has excellent thermal resistance.

Furthermore, employing the non diamond type carbon material containing C13 by at least 50% allows polycrystalline diamond high in hardness and strength to be readily prepared under a condition milder than a method employing conventional direct conversion to prepare polycrystalline diamond does.

BEST MODES FOR CARRYING OUT THE INVENTION

The present invention provides polycrystalline diamond obtained by converting a composition of material that contains a non diamond type carbon material into diamond and sintering it. Note that the composition of material may be formed of a non diamond type carbon material alone, or of a non diamond type carbon material and diamond, or may contain a further, another material.

Material

The present invention can employ a non diamond type carbon material, which may be a composition of material of any one of: a graphite type carbon material; a non graphite type carbon material; and a graphite type carbon compound and a non graphite type carbon material.

The graphite type carbon material can include a platelet graphite type carbon material, a fine graphite type carbon material, and the like.

The fine graphite type carbon material can be obtained by pulverizing the platelet graphite type carbon material or a similar graphite type carbon material mechanically by a planetary ball mill or the like to have a grain size of at most 50 nm. The graphite type carbon material can be pulverized in an atmosphere of an inert gas to prevent the pulverized fine carbon material from having a surface adsorbing gas, moisture and the like that prevent converting into diamond and sintering it. This can reduce an impurity otherwise disadvantageously mixed into finally obtained, high-hardness polycrystalline diamond.

If the platelet graphite and the non graphite type carbon material are mixed together and used as a material, the non graphite type carbon material is preferably added in an amount of 10-95% by volume of the entirety of the material. If the non graphite type carbon material is added in an amount less than 10% by volume, lamellae or coarse granules of diamond would be produced in a large amount and contact each other on small areas. Thus, such contact interface experiences stress concentration and the polycrystalline diamond may readily break, crack, or the like. If the non graphite type carbon material is added in an amount exceeding 95% by volume, lamellar or coarse granular diamond would be produced in a small amount. The lamellar or coarse granular diamond that insufficiently exists is insufficient to effectively prevent plastic deformation and extension of micro cracks, and the polycrystalline diamond may be fragile.

The non graphite type carbon material can include e.g.: graphite that has been ultra-finely pulverized; glassy carbon; amorphous carbon; fullerene; carbon nanotube, and the like.

The non graphite type carbon material is not particularly limited in crystallinity. It can include fullerene, carbon nanotube and a similar crystalline carbon material, glassy carbon, amorphous carbon and a similar amorphous carbon material.

The non graphite type carbon material is not particularly limited in geometry. It may be carbon nanotube or a similar, cylindrical or tubular non graphite type carbon material, or fullerene or a similar, spherical, non graphite type carbon material.

High-Hardness Polycrystalline Diamond

The present high-hardness polycrystalline diamond is a polycrystal formed substantially only of diamond obtained by converting a composition of material that contains a non diamond type carbon material directly into diamond and sintering it at ultra high pressure and ultra high temperature without aid of a sintering aid or a catalyst. The high-hardness polycrystalline diamond has a mixed microstructure having a fine crystal grain of diamond having a maximal grain size of at most 100 nm and an average grain size of at most 50 nm and a coarse crystal grain of diamond in the form of one of a platelet and a granule having a grain size of 50-10,000 nm.

The present polycrystalline diamond contains the coarse crystal grain of diamond in the form of one of a platelet and a granule, which functions to prevent plastic deformation and extension of micro cracks. The present polycrystalline diamond can thus prevent plastic deformation and extension of micro cracks, and thus exhibit significant toughness and high hardness and also contribute to a significantly reduced variation in property between samples.

The coarse crystal grain of diamond preferably has a grain size of 50-1,000 nm.

If the coarse crystal grain of diamond is excessively small, it can insufficiently function to prevent plastic deformation and extension of micro cracks. If the coarse crystal grain of diamond is excessively large, the coarse grain's plastic deformation and cleavage (or internal destruction) has an effect causing an increased tendency of the polycrystalline diamond toward reduced hardness and strength.

Polycrystalline Diamond

The present polycrystalline diamond is not particularly limited in composition, geometry or the like as long as it provides a first-order Raman spectral line appearing in a range of a wave number of at least 1,332.2 cm$^{-1}$. Inter alia, polycrystalline diamond having a mixed microstructure having a fine grain of diamond and a lamellar or granular, coarse grain of diamond, or a polycrystalline diamond formed only of a fine grain of diamond is preferable as polycrystalline diamond in terms of strength, hardness and thermal resistance.

Furthermore, it is more preferable that polycrystalline diamond have a mixed microstructure having fine grains of diamond forming a matrix, as obtained by the aforementioned method, and coarse grains of diamond in the form of one of a lamella and a granule distributed in the matrix. The polycrystalline diamond that has such mixed microstructure thus has one of a lamella and a coarse glandule of diamond, which can effectively prevent the polycrystalline diamond from having plastic deformation and extension of micro cracks. The polycrystalline diamond can thus be as significantly hard as at least 120 GPa and also less vary in property.

Preferably the polycrystalline diamond contains the fine grain of diamond and the coarse grain of diamond in the form of one of a lamella and a granule at a ratio allowing such fine grains of diamond to form a portion accounting for 10-95% by volume thereof to more effectively prevent the polycrystalline diamond from having plastic deformation and extension of micro cracks.

In the present invention the fine grain of diamond indicates a grain of diamond having a maximal grain size of at most 100 nm and an average grain size of at most 50 nm.

The coarse grain of diamond in the form of one of a lamella and a granule indicates a grain of diamond having a grain size lager than the fine grain of diamond. Its grain size is not limited to a particular grain size, although it is preferably 50-10,000 nm. Inter alia, the coarse grain of diamond in the form of one of a lamella and a granule preferably has a maximal grain size of at most 200 nm (i.e., a grain size of 50-200 nm), and more preferably a maximal grain size of at most 100 nm (i.e., a grain size of 50-100 nm).

If the coarse grain of diamond in the form of one of a lamella and a granule has a grain size smaller than 50 nm, it has a tendency to be hardly able to plastically deform and hardly expected to effectively prevent extension of micro cracks. If the coarse grain of diamond in the form of one of a lamella and a granule has a grain size larger than 10,000 nm, the grain can have a portion contacting another such grain on a small area and thus experience stress concentration, and the polycrystalline diamond has a tendency to be fragile.

In the present invention the present inventors have found that polycrystalline diamond providing a first-order Raman spectral line appearing at a high wave number of at least 1,332.2 cm$^{-1}$ is excellent in strength, hardness and thermal resistance. More preferably, the polycrystalline diamond provides a first-order Raman spectral line appearing at least 1,333.0 cm$^{-1}$, and still more preferably at least 1,333.2 cm$^{-1}$ to provide further enhanced hardness, strength and thermal resistance.

Furthermore if the average grain size of all of the grains of diamond in the polycrystalline diamond is small, the sintered compact can provide a large grain boundary area and hence enhanced strength and hardness.

Method of Preparing High-Hardness Polycrystalline Diamond

The present method of preparing high-hardness polycrystalline diamond is a method converting a composition of material into diamond and simultaneously sintering it without aid of a sintering aid or a catalyst.

Composition of Material

A graphite type carbon material or diamond having an average grain size of at least 50 nm and a non graphite type carbon material or a fine graphite type carbon material are mixed together in appropriate amounts, respectively, to obtain a composition of material used as a starting material which is converted directly into diamond and sintered at a pressure allowing diamond to thermodynamically stabilize, to obtain polycrystalline diamond having a microstructure having significantly fine diamond having an average grain size of approximately 10-20 nm and forming a matrix and relatively coarse diamond having an average grain size of approximately 100-200 nm and distributed in the matrix.

Herein in the composition of material a coarse grain of the graphite type carbon material or diamond is mixed with the non graphite type carbon material or the fine graphite type carbon material, which is added in an amount preferably of 10-95% by volume.

If the composition of material contains the non graphite type carbon material added in an amount less than 10% by volume, lamellae or coarse granules of diamond contact each other and their interface experiences stress concentration. As a result the polycrystalline diamond tends to more readily break, cracks or the like. If the composition of material contains the non graphite type carbon material added in an amount exceeding 95% by volume, the lamella or coarse granule of diamond can be insufficient to effectively prevent plastic deformation and extension of micro cracks.

The coarse grain of the graphite type carbon material or diamond and the non graphite type carbon material or the fine graphite type carbon material that have been mixed together are preferably introduced into a capsule of Mo, Ta, or a similar metal and thus used as the composition of material.

In the case where the coarse grain of the graphite type carbon material or diamond and the non graphite type carbon material or the fine graphite type carbon material that have been mixed together are used, if the coarse grain of the graphite type carbon material or diamond and the fine graphite type carbon material that have been mixed together are introduced into a capsule of metal, they are preferably done so in an atmosphere of a highly pure inert gas. This can reduce generation of absorbed gas and absorbed moisture preventing conversion and sintering.

Conversion to Diamond

The composition of material is held by an ultra high pressure and ultra high temperature generation apparatus at least 1,500° C. for a predetermined period of time in an environment of pressure allowing diamond to thermodynamically stabilize. It is thus converted into diamond and simultaneously sintered to be high-hardness polycrystalline diamond.

If the composition of material contains the coarse grain of the graphite type carbon material implemented as graphite in the form of a platelet having a grain size of 50 nm, the composition of material is preferably processed at a high temperature of at least 2,000° C. to completely convert the composition of material into diamond.

In another method, the composition of material may be introduced into a capsule of Mo, Ta or similar metal and held by an ultra high pressure and ultra high temperature generation apparatus (a diamond anvil) at least 2,000° C. for a predetermined period of time in an environment of pressure allowing diamond to thermodynamically stabilize, to alter the composition of material to be diamond and simultaneously sinter it to obtain high-hardness polycrystalline diamond. If the composition of material is graphite in the form of a platelet having a grain size of 50 nm, the composition of material is preferably processed at a high temperature of at least 2,200° C. to completely convert the composition of material into diamond.

Furthermore, if amorphous carbon, fullerene, carbon nanotube in the form of powder, graphite pulverized mechanically by a planetary ball mill or the like to be fine graphite powder having a grain size of at most 50 nm, or the like is alone used as material, it is preferable that the material have moisture, gas and the like adsorbed in its surface, removed in a vacuum at a temperature of at least 200° C., and the material be introduced into a sample capsule in a highly pure, inert gas.

If the fine graphite powder is alone used as material, then for example at 12 GPa and 1,500-2,000° C., polycrystalline diamond formed of significantly fine grains (having a grain size of at most 10 nm) can be obtained. However, it is insufficiently sintered, and in this case, it has a tendency to provide a first-order Raman spectral line appearing at a wave number lower than 1,330 $cm^{-1}$. Such polycrystalline diamond is as small in hardness as 70-80 GPa and also provides inferior cutting performance.

Accordingly if the fine graphite powder is alone used as material, it is preferable to sinter it at least 2,000° C.

In the process for converting the composition of material into diamond, the composition of material can be heated in a variety of methods. Preferably, it is indirectly heated with a high-temperature, heat resistant heater of Re or $LaCrO_3$, since if the composition of material is heated by electricity conduction, laser exposure or the like, it is difficult to maintain the composition of material at a constant temperature for a predetermined period of time, and as a result, unconverted graphite readily remains and the polycrystalline diamond would also have an increased tendency to have an unsintered portion.

In the process for converting the composition of material into diamond, diamond can thermodynamically stabilize at a pressure corresponding to a range shown in FIG. 1, and this pressure, as shown in the figure, varies with temperature and is not determined uniquely. In the present invention this process is done at least 1,500° C., as has been described above. Accordingly, with this temperature considered, it is preferable to select the pressure within a hatched range shown in FIG. 1, as appropriate. Furthermore, even in the range allowing diamond to stabilize, low pressure facilitates an unconverted portion to remain. Accordingly, a pressure slightly higher than an equilibrium line, which is indicated in FIG. 1 by a chained line, is preferable. More specifically, at least 8.5 GPa is preferable. Note that in FIG. 1, a range above the chained line is the range allowing diamond to stabilize and that below the chained line is the range allowing graphite to stabilize.

Furthermore in the process for converting the composition of material into diamond, a predetermined temperature and a predetermined pressure are maintained for a period of time, which is not particularly limited, although preferably it is approximately 10-10,000 seconds for example.

Thus there is reliably obtained polycrystalline diamond having a microstructure having fine grains of diamond forming a matrix and lamellar or relatively coarse diamond crystals distributed in the matrix. The lamella or coarse granule of diamond effectively prevents plastic deformation and extension of micro cracks. The present polycrystalline diamond can thus be as significantly hard as at least 120 GPa and also less vary in property. The present polycrystalline diamond is thus significantly useful for cutting tools, dressers, dies and other tools and excavation bits and the like.

The present polycrystalline diamond formed substantially only of significantly hard diamond grains containing C13 by at least 50% can be prepared for example by using a non diamond type carbon material containing C13 by at least 50% as a starting material, and converting the starting material directly into diamond and sintering it.

Carbon normally contains C12 and C13 as natural isotopes by 98.9% by volume and 1.1% by volume, respectively. (Carbon contains C14 by $1.2 \times 10^{-10}$% by volume.) For example, C13 methane can be separated from liquefied natural gas by low temperature precision distillation, and from that methane gas, carbon having a large content of C13 can be obtained. The present invention employs carbon having a large content of C13 as a starting material directly converted and sintered to prepare polycrystalline diamond. As a result, the prepared polycrystalline diamond has each diamond grain containing C13 in a large amount. The present inventors have found that C13 contained in an amount exceeding 50% obviously enhances polycrystalline diamond in hardness.

The present polycrystalline diamond is formed of diamond having a large content of C13 and thus larger in hardness than normal diamond, and in addition, having each grain having random orientation. It thus does not have such cleavage or anisotropy of hardness as monocrystalline diamond, CVD-synthesized diamond and the like do. The present invention can thus readily provide a significantly hard and tough polycrystalline diamond that has not conventionally been obtained.

The present polycrystalline diamond is preferably configured of crystal grains of diamond having a maximal grain size and an average grain size controlled to be at most 100 nm and at most 50 nm, respectively, since the maximal and average grain sizes thus reduced can contribute to further enhanced mechanical strength. The maximal and average grain sizes thus controlled can help to provide polycrystalline diamond having a hardness of at least 90 GPa, more preferably at least 120 GPa.

The present method of preparing polycrystalline diamond is characterized in that a non diamond type carbon material containing C13 by at least 50% is converted directly into diamond and simultaneously sintered at least 1,300° C. and a pressure that allows diamond to thermodynamically stabilize, without aid of a sintering aid or a catalyst. The non diamond type carbon material containing C13 by at least 50%, as a starting material, can for example be a carbon material formed of C13 (i.e., an amorphous or graphite type carbon material) extracted from natural gas, or this carbon material formed of C13 with a carbon material that has a natural ratio of isotopes as normal (i.e., an amorphous or graphite type carbon material) added thereto by a degree smaller than 50% by volume. If C13 graphite grown into a crystal is used, preferably it is pulverized in an inert gas mechanically with a planetary ball mill or the like to be an amorphous or fine graphite type carbon material.

The present method does not employ a starting material including an iron group metal element, carbonate, and/or the like. Thus, polycrystalline diamond high in strength and thermal resistance can be prepared. Furthermore, how graphite is pulverized can control polycrystalline diamond in grain size and hence mechanical property.

In the present method the amorphous or fine graphite type carbon material containing C13 by at least 50% preferably has a maximal grain size of at most 100 nm and an average grain size of at most 50 nm. This allows polycrystalline diamond to be prepared with a maximal grain size of at most 100 nm and an average grain size of at most 50 nm and synthesized at as low a temperature as approximately 1,500° C.

Furthermore, the amorphous or fine graphite type carbon material containing C13 by at least 50%, that has a maximal grain size of at most 50 nm, is more preferable. This can provide polycrystalline diamond prepared to have a grain of diamond having a maximal grain size of at most 50 nm, and synthesized at as low a temperature as approximately 1,300° C.

Furthermore, the amorphous or fine graphite type carbon material containing C13 by at least 50% may be a material having a crystallite having a size of at most 50 nm, as obtained by a half-width of a (002) diffraction line of an X-ray diffraction diagram. In that case, polycrystalline diamond is prepared with an average grain size of at most 50 nm and can be synthesized at as low a temperature as approximately 1,300° C. Determining a size of a crystallite by the half-width of the (002) diffraction line of the X-ray diffraction diagram determines that of a crystallite corresponding to an average size of crystallites. It can determine an average crystallite size more readily than directly measuring a grain size.

Furthermore, the amorphous or fine graphite type carbon material containing C13 by at least 50% may be a material having a crystallite having a size of at most 30 nm, as obtained by the half-width of the (002) diffraction line of the X-ray diffraction diagram. In that case, polycrystalline diamond is prepared with an average grain size of at most 30 nm.

Furthermore, the amorphous or fine graphite type carbon material obtained by mechanically pulverizing graphite containing C13 by at least 50% for an increased period of time to a degree at which the (002) diffraction line cannot be observed in the X-ray diffraction diagram, can be used as a starting material. The fact that the (002) diffraction line cannot be observed in the X-ray diffraction diagram indicates that the graphite type carbon material has substantially been amorphousized, and this provides polycrystalline diamond prepared with a further reduced crystal grain size.

In the present method of preparing polycrystalline diamond, the starting material of the non diamond type carbon material containing C13 by at least 50% preferably has as high a purity as possible, e.g., at least 99.9%. The material is pulverized in an atmosphere of an inert gas such as argon gas, nitrogen gas or the like, with a planetary ball mill or a similar pulverizer for a few hours finely to have a maximal grain size of preferably at most 100 nm, more preferably at most 50 nm. The non diamond type carbon material thus pulverized to have the maximal grain sizes of preferably at most 100 nm and more preferably at most 50 nm has average grain sizes of at most 50 nm and at most 30 nm, respectively, as calculated by the half-width of the (002) diffraction line of the X-ray diffraction diagram. More preferably, the material is sufficiently pulverized to be fine or amorphous so that the (002) diffraction line is not observed in the X-ray diffraction diagram.

The amorphous or fine graphite type carbon material containing C13 by at least 50%, that has undergone a pulverization step as required, as described above, is introduced into a capsule of Mo, Ta or similar metal in an atmosphere of a highly pure, inert gas. If a mechanically pulverized ultrafine graphite type carbon material is used, it is preferable that the material is also unfailingly introduced into the capsule in an atmosphere of a highly pure, inert gas, since ultrafine graphite is significantly active, and if it is exposed to the air it readily adsorbs gas, moisture and the like, which prevents the material from being converted into diamond and sintered.

Then the amorphous or fine graphite type carbon material containing C13 by at least 50%, that has been capsuled, is maintained for a predetermined period of time by an ultra high pressure and ultra high temperature generation apparatus at least 1,300° C. and a pressure that allows diamond to thermodynamically stabilize. The amorphous or fine graphite type carbon material containing C13 by at least 50% is thus converted directly into diamond and simultaneously sintered.

As a result, high-hardness polycrystalline diamond can be obtained that has a significantly dense and homogenous microstructure having diamond grains that contain fine C13 by at least 50%, firmly bonded together.

The pressure that allows diamond to thermodynamically stabilize is that in a range shown in FIG. 1, and this pressure, as shown in the figure, varies with temperature and is not determined uniquely. In the present invention this process is done at least 1,300° C., as has been described above. Accordingly, with this temperature considered, it is preferable to select the pressure within a hatched range shown in FIG. 1, as appropriate. Furthermore, even in the range allowing diamond to stabilize, low pressure facilitates an unconverted portion to remain. Accordingly, a pressure slightly higher than an equilibrium line, which is indicated in FIG. 1 by a chained line, is preferable. More specifically, at least 8.5 GPa is preferable. Note that in FIG. 1, a range above the chained line is the range allowing diamond to stabilize and that below the chained line is the range allowing graphite to stabilize.

Furthermore in the process for converting the amorphous or fine graphite type carbon material containing C13 by at least 50%, a predetermined temperature and a predetermined pressure are maintained for a period of time, which is not particularly limited, although preferably it is approximately 10-10,000 seconds for example.

The present polycrystalline diamond is configured of grains of diamond having a maximal grain size of at most 100 nm and an average grain size of at most 50 nm, more preferably a maximal grain size of at most 50 nm and an average grain size of at most 30 nm, and thus has a significantly fine and homogenous microstructure. Also, as it is formed of hard diamond containing C13 by at least 50%, the polycrystalline diamond has a hardness of at least 90 GPa, and in some case, a hardness of at least 120 GPa, which exceeds that of normal, monocrystalline diamond. Furthermore, the polycrystalline diamond is formed substantially only of diamond containing C13 by at least 50% and does not contain a metallic catalyst or a sintering aid at all, and if it is placed for example in a vacuum and at 1,400° C., it is not observed to have graphitization or micro cracks. The present polycrystalline diamond is thus significantly useful for cutting tools, dressers, dies and other tools and excavation bits and the like.

EXAMPLES

Examples 1-10 and Comparative Examples 1-4

Graphite powder good in crystallinity having a grain size of 0.05-10 μm and a purity of at least 99.95% or synthetic diamond powder having a grain size of 0.05-3 μm with a variety of non graphite type carbon materials, i.e., graphite ultra-finely pulverized to be powder, grassy carbon powder, fullerene powder, and carbon nanotube powder, added thereto, is introduced into an Mo capsule and sealed to prepare a composition of material.

The composition of material is processed by a belt-type ultra high pressure generation apparatus at different pressures and different temperatures for 30 minutes to obtain high-hardness polycrystalline diamond.

The obtained polycrystalline diamond's formed phase is identified by X-ray diffraction and its constituent grain's size is examined by TEM observation. Furthermore, the obtained high-hardness polycrystalline diamond's surface is polished to be a mirror finished surface, which is in turn measured in hardness with a micro Knoop hardness meter.

Table 1 shows a result of the measurement.

In table 1, "Gr" represents graphite and "Dia" represents diamond. Furthermore, the "base material" and "additive" columns indicate the base material and additive's respective particle sizes. The "amount of additive" column indicates that of additive in the composition of material.

TABLE 1

| | Composition of Material | | | Conditions for Synthesis | | Product (Polycrystalline Diamond) | | |
|---|---|---|---|---|---|---|---|---|
| | Base Material | Additive | Amount of Additive | Pressure | Temperature | Grain Size of Coarse Grain | Grain Size of Fine Grain | Knoop Hardness |
| Ex. 1 | 1-3 μm Gr | 35 nm Gr | 50 vol % | 12 GPa | 2,300° C. | 50-300 nm (lamellar) | 40 nm | 120 GPa |
| Ex. 2 | 1-3 μm Gr | 25 nm Gr | 70 vol % | 12 GPa | 2,300° C. | 50-300 nm (lamellar) | 30 nm | 130 GPa |
| Ex. 3 | 1-3 μm Gr | 10 nm Gr | 30 vol % | 12 GPa | 2,100° C. | 50-200 nm (lamellar) | 15 nm | 130 GPa |
| Ex. 4 | 0.1-1 μm Dia | 10 nm Gr | 50 vol % | 9 GPa | 1,900° C. | 100-1,000 nm | 15 nm | 120 GPa |
| Ex. 5 | 1-3 μm Gr | glassy carbon | 50 vol % | 9 GPa | 1,900° C. | 50-200 nm (lamellar) | 10 nm | 120 GPa |
| Ex. 6 | 1-3 μm Gr | fullerene | 50 vol % | 9 GPa | 1,900° C. | 50-200 nm (lamellar) | 10 nm | 120 GPa |
| Ex. 7 | 1-3 μm Gr | carbon nanotube | 50 vol % | 9 GPa | 1,900° C. | 50-200 nm (lamellar) | 10 nm | 120 GPa |
| Ex. 8 | 0.1-1 μm Dia | glassy carbon | 50 vol % | 9 GPa | 1,900° C. | 100-1,000 nm | 10 nm | 120 GPa |
| Ex. 9 | 0.1-1 μm Dia | fullerene | 50 vol % | 9 GPa | 1,900° C. | 100-1,000 nm | 10 nm | 120 GPa |
| Ex. 10 | 0.1-1 μm Dia | Carbon nanotube | 50 vol % | 9 GPa | 1,900° C. | 100-1,000 nm | 10 nm | 120 GPa |
| Comp. Ex. 1 | 1-3 μm Gr | none | — | 12 GPa | 2,300° C. | 50-100 nm (lamellar) | 25 nm | 100-130 GPa |
| Comp. Ex. 2 | 0.1-1 μm Dia | none | — | 12 GPa | 2,300° C. | 100-1,000 nm | none | 70-90 GPa |
| Comp. Ex. 3 | glassy carbon | none | — | 9 GPa | 1,900° C. | none | 10 nm | 95 GPa |
| Comp. Ex. 4 | fullerene | none | — | 9 GPa | 1,900° C. | none | 10 nm | 80 GPa |

The above result shows that when a coarse grain of a graphite type carbon material or diamond having an average grain size of at least 50 nm with a non graphite type carbon material or a fine graphite type carbon material added thereto in a range of at least 10% by volume to at most 95% by volume is sealed in a metallic capsule to provide a composition of material, and the composition of material is in turn placed in an environment of ultra high pressure and ultra high temperature and thus converted directly into diamond and sintered, polycrystalline diamond is reliably obtained that has a microstructure having fine grains of diamond having an average grain size of at most 50 nm and forming a matrix and coarse crystal grains of diamond in the form of one of a platelet and a granule having a grain size of at least 50 nm and distributed in the matrix.

The obtained polycrystalline diamond is found to be much harder than a sintered compact with a Co binder, as conventional, which provides 60-80 GPa, and also does not have such a variation in hardness as seen in a polycrystal formed with graphite used as material, as conventional.

Examples 11-19

A material formed of: graphite powder good in crystallinity having a grain size of 0.05-10 μm and a purity of at least 99.95%; the aforementioned graphite powder which is ultra-finely pulverized to be powder; grassy carbon powder; fullerene powder; and carbon nanotube powder is used. The powders are mixed together and introduced and sealed in an Mo capsule which is in turn processed by a belt-type ultra high pressure generation apparatus at different pressures and different temperatures for 30 minutes to obtain samples.

The samples had their respective formed phases identified by X-ray diffraction and their respective constituent grains measured in size through TEM observation. Furthermore, the samples had their respective surfaces polished to be mirror finished surfaces, which were in turn measured in hardness with a micro Knoop hardness meter, and on the polished surfaces, Raman spectral measurement was conducted to obtain a position of a first-order Raman spectral line. In doing so, a Raman spectroscope was used with an excitation light source implemented by a lasing ray of an Ar ion laser, and the measurement was done in a back scattering configuration. A crystal of synthetic type-IIa diamond devoid of strain and defect was used as a standard sample for reference (with a first-order Raman spectral line at 1,330.0 cm$^{-1}$).

Table 2 shows a result of the experiment.

In table 2, "Gr" represents graphite and "1-3 μm Gr" represents a graphite grain having an average grain size of 1-3 μm. A first-order Raman spectral line is represented in cm$^{-1}$.

Furthermore, in table 2, "maximal grain size" and "average grain size" indicate those of all diamond grains.

Example and Comparative Example

Samples of a non diamond type carbon material varying in material and grain size are prepared as a starting material and used in an experiment to synthesize polycrystalline diamond.

Preparing Starting Material

As a starting material, samples were prepared as follows. The samples are outlined as shown in table 3.

(a) graphite having an average grain size of 1-3 μm and a purity of at least 99.95% and containing C13, an isotope of carbon, by 99% (sample (a));

(b) pulverized graphite formed of sample (a), or C13 graphite, which is introduced into a pot of silicon nitride together with a ball of silicon nitride having a diameter of 5 mm, and is pulverized in highly purely refined argon gas mechanically by a planetary ball mill at 500 rpm for a period of time varied from one hour to 20 hours (samples (b)-1 to (b)-3);

(c) natural graphite (having an isotope C12:C13 ratio=98.9:1.1) pulverized similarly as done to obtain sample (b) (samples (c)-1 to (c)-3); and (d) sample (a) or (b) and sample (c) mixed together (samples (d)-1 to (d)-4).

The pulverized samples were recovered in a glove box filled with highly pure argon gas, and their grain sizes were examined through SEM or TEM observation and their average grain sizes (or crystallite sizes) were obtained from a half-width of a (002) diffraction line of graphite of an X-ray diffraction diagram in accordance with Scherrer's equation. A result thereof is also shown in table 3.

Synthesizing Polycrystalline Diamond

Each sample was sealed in an Mo capsule in the aforementioned glove box and processed by a belt-type ultra high pressure generation apparatus for 30 minutes at different pressures and different temperatures. The sample had a formed phase, which was identified by X-ray diffraction, and

TABLE 2

| | Material | | Conditions for Synthesis | | Polycrystalline Diamond | | | | | | |
|---|---|---|---|---|---|---|---|---|---|---|---|
| | | | | | Distribution in Grain Size of | Average Grain Size of | Maximal Grain Size of | Average | Portion formed of fine grains | | First-order Raman |
| | Base Material | Additive | Amount of Additive | Pressure | Temperature | Coarse Grain | Fine Grain | Fine Grain | Grain Size | exists at a ratio of: | Knoop Hardness | Spectral Line |
| Ex. 11 | 1-3 μm Gr | 35 nm Gr | 50 vol % | 15 GPa | 2,300° C. | 50-300 nm (lamellar) | 40 nm | 100 nm | 85 nm | 75 vol % | 120 GPa | 1,333.6 |
| Ex. 12 | 1-3 μm Gr | 25 nm Gr | 70 vol % | 15 GPa | 2,300° C. | 50-300 nm (lamellar) | 30 nm | 80 nm | 100 nm | 85 vol % | 130 GPa | 1,333.6 |
| Ex. 13 | 1-3 μm Gr | 10 nm Gr | 30 vol % | 15 GPa | 2,100° C. | 50-200 nm (lamellar) | 20 nm | 50 nm | 70 nm | 65 vol % | 130 GPa | 1,333.4 |
| Ex. 14 | 1-3 μm Gr | glassy carbon | 50 vol % | 12 GPa | 2,100° C. | 50-200 nm (lamellar) | 20 nm | 50 nm | 80 nm | 75 vol % | 120 GPa | 1,333.2 |
| Ex. 15 | 1-3 μm Gr | fullerene | 50 vol % | 12 GPa | 2,100° C. | 50-200 nm (lamellar) | 20 nm | 50 nm | 80 nm | 75 vol % | 120 GPa | 1,333.2 |
| Ex. 16 | 1-3 μm Gr | carbon nanotube | 50 vol % | 12 GPa | 2,100° C. | 50-200 nm (lamellar) | 20 nm | 50 nm | 80 nm | 75 vol % | 120 GPa | 1,333.2 |
| Ex. 17 | 1-3 μm Gr | none | — | 15 GPa | 2,300° C. | 50-100 nm (lamellar) | 25 nm | 50 nm | 50 nm | 50 vol % | 110 GPa | 1,333.0 |
| Ex. 18 | 25 nm Gr | none | — | 15 GPa | 2,100° C. | none | 20 nm | 50 nm | 20 nm | 100 vol % | 120 GPa | 1,332.7 |
| Ex. 19 | fullerene | none | — | 15 GPa | 2,000° C. | none | 15 nm | 40 nm | 15 nm | 100 vol % | 110 GPa | 1,332.5 | its constituent grain's size was examined through TEM observation. Some sample was firmly sintered, and accordingly, had its surface mirror-polished and thus measured in hardness with a micro Knoop hardness meter.

A result of the experiment for synthesis is shown in table 4. The result shows that when graphite-like carbon containing C13, an isotope of carbon, by at least 50% is used as a starting material, a hardness increased to be larger by at least 1.1 times is provided than when normal graphite is used as a starting material. Furthermore, it has also been found that a starting material formed of C13 graphite pulverized to be fine grains having a maximal grain size of at most 100 nm or an average grain size of at most 50 nm is converted into diamond and sintered at milder, high pressure and high temperature. It can be seen that they both provide polycrystal much harder than a sintered compact with a Co binder, as conventional, i.e., 60-80 GPa, and as hard as or harder than monocrystalline diamond, i.e., 85-110 GPa.

TABLE 3

| Sample Nos. | Material | Pulverization Time (min.) | Maximal Grain Size (nm) | Average Grain Size (nm) |
|---|---|---|---|---|
| (a) | C13 graphite | 0 | 10 μm | 1-3 μm |
| (b)-1 | (a) | 2 | 80 | 20-50 |
| (b)-2 | | 6 | 50 | 10-30 |
| (b)-3 | | 10 | 20 | at most 10 |
| (c)-1 | natural graphite | 6 | 50 | 10-30 |
| (c)-2 | | 2 | 80 | 20-50 |
| (c)-3 | | 10 | 20 | at most 10 |
| (d)-1 | (b)-2: 60%, (c)-1: 40% | | | |
| (d)-2 | (b)-3: 60%, (c)-3: 40% | | | |
| (d)-3 | (a): 60%, (c)-3: 40% | | | |
| (d)-4 | (b)-1: 30%, (c)-2: 70% | | | |

TABLE 4

| | Conditions for Synthesis | | Polycrystalline Diamond | | |
|---|---|---|---|---|---|
| Starting Material | Pressure (GPa) | Temperature (° C.) | Maximal Grain Size (nm) | Average Grain Size (nm) | Hardness (GPa) |
| (a) | 12 | 2,300 | 100 | 10-80 | 120 |
| (b)-1 | 9 | 2,100 | 50 | 20-30 | 125 |
| (b)-2 | 9 | 2,100 | 30 | 10-20 | 130 |
| (b)-3 | 8 | 1,700 | 20 | 5-10 | 110 |
| (b)-3 | 8 | 1,400 | 20 | 5-10 | 95 |
| (c)-3 | 8 | 1,400 | 20 | 5-10 | 80 |
| (d)-1 | 9 | 2,100 | 30 | 10-20 | 120 |
| (c)-2 | 9 | 2,100 | 30 | 10-20 | 110 |
| (d)-2 | 8 | 1,700 | 20 | 5-10 | 100 |
| (d)-3 | 12 | 2,200 | 100 | 5-80 | 115 |
| (d)-4 | 9 | 2,100 | 30 | 10-20 | 110 |

INDUSTRIAL APPLICABILITY

The present high-hardness polycrystalline diamond is a polycrystal of single-phase diamond which is dense and homogenous, and sufficiently strong, hard and thermally resistant. It is significantly excellent is mechanical property and thermal stability, and can thus be utilized as a significantly effective material for cutting tools, dressers, dies and other tools and excavation bits and the like.

Furthermore the present cutting tool is useful as a cutting tool for cutting a variety of metals.

Figure 1:
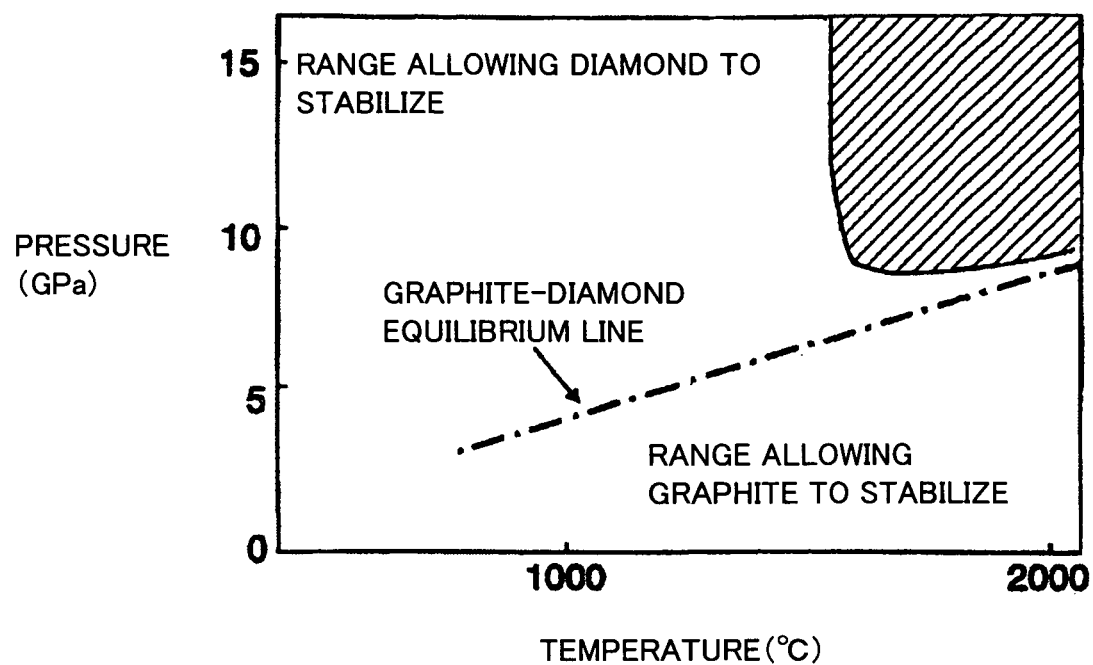
FIG. 1 shows a range allowing diamond to thermodynamically stabilize, as represented by a relationship between pressure and temperature.
Figure 2:
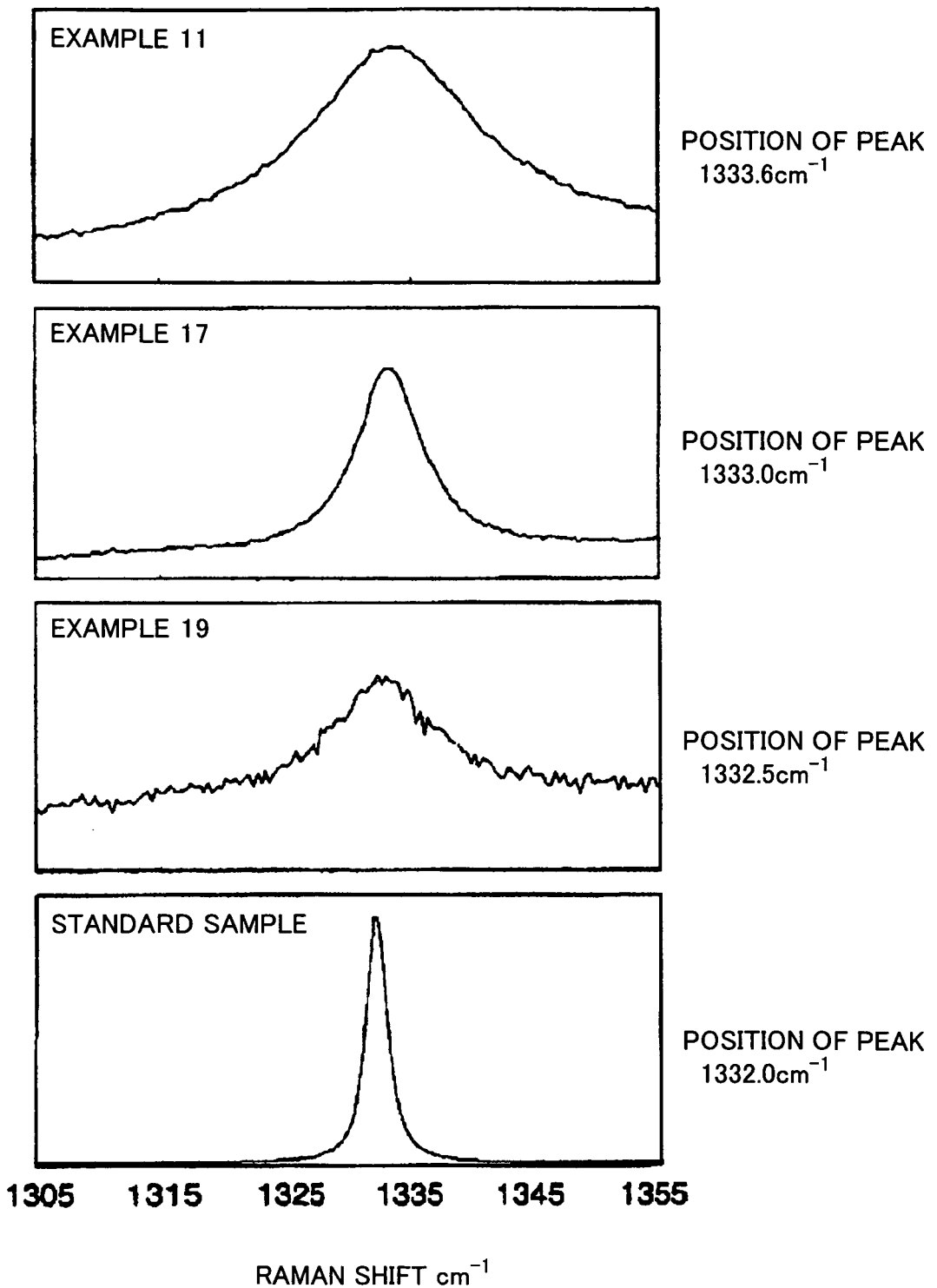
FIG. 2 are graphs of a first-order Raman spectral line of each of examples 11, 17 and 19 in the present invention, and a standard sample.

The invention claimed is:

1. High-hardness polycrystalline diamond formed substantially only of diamond formed using a composition of material containing a non diamond type carbon material, said composition of material being converted directly into diamond by sintering at ultra high pressure and ultra high temperature without aid of a sintering aid or a catalyst, wherein:
the polycrystalline diamond provides a first-order Raman spectral line appearing at a high wave number of at least 1,333.2 cm$^{-1}$,
the polycrystalline diamond has a microstructure having fine grains of diamond forming a matrix and lamellar or relatively coarse diamond crystals distributed in the matrix, and
the polycrystalline diamond has a mixed microstructure having a fine crystal grain of diamond having a maximal grain size of at most 100 nm and an average grain size of at most 50 nm and a coarse crystal grain of diamond in a form of a platelet or a granule having a grain size of greater than 200 nm to 10,000 nm.

2. The high-hardness polycrystalline diamond according to claim 1, wherein said fine crystal grain of diamond has a maximal grain size of at most 50 nm and an average grain size of at most 30 nm.

3. The high-hardness polycrystalline diamond according to claim 1, wherein said coarse crystal grain of diamond has a grain size of greater than 200 nm to 1,000 nm.

4. The high-hardness polycrystalline diamond according to claim 1, wherein said fine crystal grain diamond constitutes 10-95 volume % of polycrystalline diamond.

5. A method of preparing high-hardness polycrystalline diamond by converting a composition of material containing a coarse grain of a graphite type carbon material and one of a non graphite type carbon material and a fine graphite type carbon material directly into diamond and simultaneously sintering the same without aid of a sintering aid or a catalyst at at least 1,500° C. and a pressure allowing diamond to thermodynamically stabilize,
wherein the polycrystalline diamond provides a first-order Raman spectral line appearing at a high wave number of at least 1,333.2 cm$^{-1}$,
the polycrystalline diamond has a microstructure having fine grains of diamond forming a matrix and lamellar or relatively coarse diamond crystals distributed in the matrix,
the polycrystalline diamond has a mixed microstructure having a fine crystal grain of diamond having a maximal grain size of at most 100 nm and an average grain size of at most 50 nm and a coarse crystal grain of diamond in a form of a platelet or a granule having a grain size of greater than 200 nm to 10,000 nm,
said coarse grain of said graphite type carbon material has an average grain size of at least 50 nm,
said fine graphite type carbon material has an average grain size smaller than 50 nm, and
one of said non graphite type carbon material and said fine graphite type carbon material accounts for 10-95% by volume of said composition of material.

6. The method of preparing high-hardness polycrystalline diamond according to claim 5, wherein said non graphite type carbon material is a fine, non graphite type carbon material formed of a graphite type carbon material mechanically pulverized in an inert gas to have a grain size of at most 50 nm.

7. The method of preparing high-hardness polycrystalline diamond according to claim 5, wherein said non graphite type carbon material is an amorphous carbon material.

8. The method of preparing high-hardness polycrystalline diamond according to claim 5, wherein said non graphite type carbon material is a carbon material in a form of one of a cylinder and a tube.

9. The method of preparing high-hardness polycrystalline diamond according to claim 5, wherein said non graphite type carbon material is a carbon material in a form of a sphere.

10. A method of preparing high-hardness polycrystalline diamond by converting a composition of material containing diamond and a non graphite type carbon material directly into diamond and simultaneously sintering the same without aid of a sintering aid or a catalyst at least 1,500° C. and a pressure allowing diamond to thermodynamically stabilize,
    wherein the polycrystalline diamond provides a first-order Raman spectral line appearing at a high wave number of at least 1,333.2 cm$^{-1}$,
    the polycrystalline diamond has a microstructure having fine grains of diamond forming a matrix and lamellar or relatively coarse diamond crystals distributed in the matrix,
    the polycrystalline diamond has a mixed microstructure having a fine crystal grain of diamond having a maximal grain size of at most 100 nm and an average grain size of at most 50 nm and a coarse crystal grain of diamond in a form of a platelet or a granule having a grain size of greater than 200 nm to 10,000 nm,
    said diamond has an average grain size of at least 50 nm, and
    said non graphite type carbon material accounts for 10-95% by volume of said composition of material.

11. The method of preparing high-hardness polycrystalline diamond according to claim 10, wherein said non graphite type carbon material is a fine, non graphite type carbon material formed of a graphite type carbon material mechanically pulverized in an inert gas to have a grain size of at most 50 nm.

12. The method of preparing high-hardness polycrystalline diamond according to claim 10, wherein said non graphite type carbon material is an amorphous carbon material.

13. The method of preparing high-hardness polycrystalline diamond according to claim 10, wherein said non graphite type carbon material is a carbon material in a form of one of a cylinder and a tube.

14. The method of preparing high-hardness polycrystalline diamond according to claim 10, wherein said non graphite type carbon material is a carbon material in a form of a sphere.

15. A method of preparing high-hardness polycrystalline diamond by converting a non diamond type carbon material directly into diamond and simultaneously sintering the same without aid of a sintering aid or a catalyst at least 1,300° C. and a pressure allowing diamond to thermodynamically stabilize,
    wherein the polycrystalline diamond provides a first-order Raman spectral line appearing at a high wave number of at least 1,333.2 cm$^{-1}$,
    the polycrystalline diamond has a microstructure having fine grains of diamond forming a matrix and lamellar or relatively coarse diamond crystals distributed in the matrix,
    the polycrystalline diamond has a mixed microstructure having a fine crystal grain of diamond having a maximal grain size of at most 100 nm and an average grain size of at most 50 nm and a coarse crystal grain of diamond in a form of a platelet or a granule having a grain size of greater than 200 nm to 10,000 nm, and
    said non diamond type carbon material contains an isotope of carbon by at least 50%, said isotope of carbon being C13.

16. The method of preparing high-hardness polycrystalline diamond according to claim 15, wherein said non diamond type carbon material is pulverized in an atmosphere of an inert gas to have a maximal grain size of at most 100 nm for use.

\* \* \* \* \*